United States Patent Office 3,547,955
Patented Dec. 15, 1970

3,547,955
2,3-DIHYDRO-2,2-DIMETHYL-7-BENZOFURANYL
N-(DIMETHYLAMINO) CARBAMATE
William G. Scharpf, Rocktown, N.J., assignor to FMC
Corporation, New York, N.Y., a corporation of Delaware
No Drawing. Filed Nov. 25, 1966, Ser. No. 596,769
Int. Cl. C07d 5/36
U.S. Cl. 260—346.2          1 Claim

ABSTRACT OF THE DISCLOSURE

Certain novel N-N-disubstituted dihydrobenzofuranyl carbamates and their use to control Arthropoda and Nematoda.

CROSS REFERENCE TO RELATED APPLICATION

This application is related to my copending applications Ser. No. 339,612, filed Jan. 23, 1964 now U.S. Pat. No. 3,474,171 and Ser. No. 403,324, filed Oct. 12, 1964 now U.S. Pat. No. 3,474,170.

BACKGROUND OF THE INVENTION

This invention pertains to organic chemical compounds useful as insecticides, acaricides, and nematocides.

In the past certain organic carbamates have been found to have biological activity. Thus, Hartle et al., U.S. Pat. 2,951,850, disclose certain phenyl carbamates as insecticides, and Wasson et al., U.S. Pat. 3,073,848, report some tetrahydrofuran carbamates as therapeutic agents. To my knowledge no earlier workers have found the unusual pesticidal properties of the benzofuran carbamates described herein.

SUMMARY OF THE INVENTION

This invention relates to new chemical compounds and their preparation, to pesticidal compositions containing these new compounds, including insecticidal, acaricidal, and nematocidal compositions, and to the use of said compositions to control Arthropoda and Nematoda. More particularly, this invention relates to certain N-alkylcarbamic acid esters of dihydrobenzofuranols having a second N-substituent, as novel and effective pesticides. The precise structure of the compounds of this invention will be more fully understood by reference to the generic formula given in the following section.

DESCRIPTION OF THE PREFERRED EMBODIMENTS

The compounds of this invention, and their numbering system, are represented by the general formula:

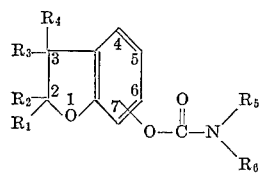

where $R_1$, $R_2$, $R_3$, $R_4$, and $R_5$ are the same or different and may be hydrogen or a lower alkyl hydrocarbon group having up to six carbon atoms, e.g., methyl, ethyl, propyl, isopropyl, isobutyl, sec-butyl, neopentyl, sec-amyl, n-hexyl, and the like; and $R_6$ may be —$OR_1$, —$N(R_1)_2$, or —$C(O)R_7$, where $R_1$ is as above defined and $R_7$ represents phenyl, benzyl, or an alkyl or alkenyl group having one to three carbon atoms and selected from the group consisting of hydrocarbons, bromine-substituted hydrocarbons, and chlorine-substituted hydrocarbons, e.g., —$CCl_3$, —$CHCl_2$, —$CH_2Br$, —$CH=CH_2$, —$C(CH_3)=CH_2$, —$CH=CHCl$, and the like.

Certain particularly preferred compounds of this invention include compounds of the general formulae:

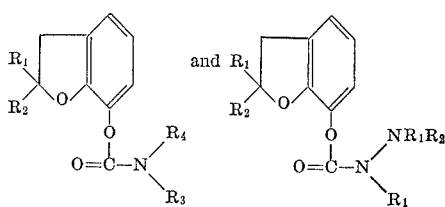

wherein $R_1$ and $R_2$ are the same or different and are hydrogen or methyl; $R_3$ is methyl or ethyl; and $R_4$ is —$OR_1$ or a two carbon acyl group having as substituents bromine, chlorine, or hydrogen, e.g., —$CH_2Br$, —$CH_2Cl$, —$CH_3$, —$CHCl_2$, —$CCl_3$.

Compounds of this invention exhibit outstanding pesticidal activity, including effective activity against Nematoda and against Arthropoda such as Coleoptera (beetles), Hemiptera (true bugs), Homoptera (aphids), Acarina (mites), Diptera (flies and wasps), Blatteria (roaches), and Lepidoptera (moths and butterflies).

The compounds of this invention may be prepared by a variety of procedures. For example, the intermediate 2,3-dihydrobenzofuranols may be prepared from the appropriate allyloxyphenols by rearrangement and cyclization; by hydrogenation of the corresponding benzofuranol; and by other known methods; as described in my co-pending U.S. patent application Ser. No. 403,324, filed Oct. 12, 1964. These dihydrobenzofuranols may be converted to the 2,3-dihydrobenzofuranyl N-substituted carbamates by standard procedures such as are described by Wagner and Zook, "Synthetic Organic Chemistry," chapter 23, John Wiley and Sons, New York, 1953. Reagents such as alkyl isocyanates or isothiocyanates, and alkyl- or dialkyl-carbamoyl or -thiocarbamoyl halides, produce the carbamate ester directly. Alternatively, the 2,3-dihydrobenzofuranol may be converted to a chloroformate by reaction with phosgene, and this chloroformate reacted with the appropriate amine to form the desired carbamate.

These 2,3-dihydrobenzofuranyl N-substituted carbamates may then be reacted with usual acylating agents, such as acyl halides, acyl anhydrides and the like, to give the desired 2,3-dihydrobenzofuranyl N-acyl-N-substituted carbamates of this invention. To produce the N-hydroxy- and N-alkoxy-N-substituted carbamates of this invention, the 2,3-hydrobenzofuranyl chloroformate is reacted with the appropriately substituted hydroxylamine, R—NH—OH or R—NH—OR. These intermediate chloroformates may also be reacted with an alkaline metal salt of a mono N-substituted amide to give the dihydrobenzofuranyl N-acyl-N-substituted carbamates.

Alternatively, the dihydrobenzofuranols may be condensed with acyl isocyanates to yield dihydrobenzofuranyl N-acyl carbamates which may be subsequently alkylated in the usual manner to give the desired 2,3-dihydrobenzofuranyl N-acyl-N-substituted carbamates.

The novel compounds thus obtained may be formulated with the usual additives and extenders in the preparation of pesticidal compositions. The toxicants of this invention, like most pesticidal agents, are generally not applied full strength. They are generally incorporated with any of the adjuvants and carriers normally employed for facilitating the dispersion of active ingredients, recognizing the accepted fact that the formulation and mode of application of a toxicant may affect the activity of the material. The compounds of this invention may be applied, for example, as sprays, dusts, granules, or baits, to the area in which pest control is desired, the choice of application varying, of course, with the type of pest and the environment. Thus, these compounds may be formulated as granules of large particle size, as powdery dusts, and wettable powders, as emulsifiable concentrates, as solutions, and the like.

Dusts are admixtures of the active ingredients with finely divided solids such as talc, attapulgite clay, kieselguhr, pyrophyllite, chalk, diatomaceous earths, calcium phosphates, calcium and magnesium carbonates, sulfuric lime, flours, and other organic and inorganic solids which act as dispersants and carriers for the toxicant. These finely divided solids have an average particle size of less than about 50 microns. A typical dust formulation useful herein contains 10.0 parts of toxicant, 30.0 parts of bentonite clay and 60.0 parts talc.

The compounds may be made into liquid concentrates by solution or emulsion in suitable liquids, and into solid concentrates by admixture with talc, clays and other known solid carriers used in the pesticide art. The concentrates are compositions containing about 5-50% toxicant and the rest inert material which includes dispersing agents, emulsifying agents, and wetting agents. The concentrates are diluted for practical application, with water or other liquid for sprays or with additional solid carrier for use as dusts. Typical carriers for solid concentrates (also called wettable powders) include fuller's earth, kaolin clays, silicas, and other highly absorbent, readily wet inorganic diluents. A useful solid concentrate formulation for use herein contains 25.0 parts of toxicant, 72.0 parts of bentonite clay and 1.5 parts each of sodium lignosulfonate and sodium laurylsulfonate as wetting agents.

Useful liquid concentrates include the emulsifiable concentrates, which are homogeneous liquid or paste compositions which are readily dispersed in water or other liquid carriers, and may consist entirely of the toxicant with a liquid or solid emulsifying agent, or may also contain a liquid carrier, such as xylene, heavy aromatic naphthas, isophorone and other non-volatile organic solvents. For application these concentrates are dispersed in water or other liquid carrier, and normally applied as a spray to the area to be treated.

The concentration of the toxicant in the dilution generally used for control of insect and other pests is normally in the range of about 2% to about 0.001%. Many variations of spraying and dusting compositions in the art may be used, by substituting the compounds of this invention into compositions known or apparent to the art.

Typical wetting, dispersing or emulsifying agents used in pesticidal formulations include, for example, the alkyl and alkylaryl sulfonates and sulfates and their sodium salts, alkylamide sulfonates, including fatty methyl taurides; alkylaryl polyether alcohols; sulfated higher alcohols, polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from 1 percent to 15 percent by weight of the pesticidal composition.

Other useful formulations include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the freons, may also be used. Baits are generally prepared by mixing liquid or solid concentrates with a suitable food, such as a mixture of cornmeal and sugar.

The pesticidal compositions may be formulated and applied with other active ingredients, including other insecticides, fungicides, nematocides, plant growth regulators, fertilizers, etc. In applying the chemicals, it is obvious that an effective amount and concentration of toxicant should be employed.

The preparation and pesticidal activity of typical compounds of this invention are illustrated in the following specific examples, which are provided only by way of illustration and not of limitation. All parts are by weight where not otherwise indicated, and all temperatures are in degrees centigrade.

Example 1.—Preparation and pesticidal properties of 2,3-dihydro-2,2-dimethyl-7-benzofuranyl N-chloroacetyl-N-methylcarbamate This compound was prepared from 2-methallyloxyphenol, which was cyclized and rearranged to form a 7-benzofuranol. The 7-benzofuranol was then esterified to form an N-monosubstituted carbamate, which was reacted with chloroacetyl chloride to form the acyl carbamate.

The starting material 2-methallyloxyphenol was prepared as follows: To a stirred mixture of 322 parts of catechol in 300 parts of dry acetone was slowly added, under nitrogen atmosphere, 401 parts of potassium carbonate and 481 parts of potassium iodide. The mass was heated to reflux temperature, and 262 parts of methallyl chloride was added slowly. The mixture was refluxed for 30 hours, allowed to cool and stand for 18 hours, filtered, and the filtrate concentrated under reduced pressure. The residual oil was extracted with chloroform, and the chloroform solution washed with water, dried and concentrated. The residual oil was distilled to give 213 parts of 2-methallyloxyphenol, B.P. 78.5–83.0°/0.55 mm., $n_D^{25}$ 1.5300.

2,3-dihydro-2,2-dimethyl-7-benzofuranol was prepared as follows: A round bottom flask containing 131 parts of 2-methylallyloxyphenol was heated slowly with stirring. At 200° an exothermic reaction occurred, and the temperature of the mixture in the flask increased rapidly to 275°. The temperautre was controlled at 275° by external cooling. The thick syrup was distilled under reduced pressure to yield colorless liquid 2,3-dihydro-2,2-dimethyl-7-benzofuranol, B.P. 78–80° (0.35–0.40 mm.), $n_D^{25}$ 1.5401.

2,3-dihydro-2,2-dimethyl-7-benzofuranyl N-methylcarbamate was prepared as follows: A cold solution of 16.4 parts 2,3-dihydro-2,2-dimethyl-7-benzofuranol in 14 parts of ether was treated with 5.8 parts methyl isocyanate and 0.1 part triethylamine. The mixture was stirred at room temperature, and a white crystalline product precipitated. Separation of the solid yielded 17.5 parts of 2,3-dihydro-2,2-dimethyl-7-benzofuranyl N-methylcarbamate, M.P. 151–152°.

2,3 - dihydro - 2,2 - dimethyl - 7 - benzofuranyl N-chloroacetyl-N-methylcarbamate was prepared as follows:

9.6 parts of 2,3-dihydro - 2,2 - dimethyl-7-benzofuranyl N-methylcarbamate and 5.3 parts of chloroacetyl chloride in 22 parts of xylene was refluxed for 24 hours with stirring. Solvent was removed under reduced pressure. The residual oil was distilled to give 7.2 parts of 2,3-dihydro - 2,2 - dimethyl-7-benzofuranyl N-(chloroacetyl)-N - methylcarbamate, B.P. 136–138°/0.2 mm., $n_D^{25}$ 1.5359.

*Analysis.*—Calc'd for $C_{14}H_{16}ClNO_4$ (percent): Cl, 11.91. Found (percent): Cl, 12.17.

Insecticidal activity was measured as follows: The test compound, 2,3-dihydro-2,2-dimethyl-7-benzofuranyl N-chloroacetyl - N - methylcarbamate, was dissolved to form a 1% solution in acetone, which was then diluted with water to provide a concentration of 1250 p.p.m. of active ingredient. Test insects and techniques were as follows: The activities against Mexican bean beetles (*Epilachna varivestis* [Mulsant]) and southern armyworms (*Prodenia eridania* [Cramer]) were evaluated by dipping the leaves of pinto bean plants into the test solution, and infesting the leaves with the test insects; the activity against the two-spotted spider mite (*Tetranychus telarius* [Linnaeus]) was evaluated on pinto bean plants whose leaves were dipped after infestation; the activity against the pea aphid (*Macrosiphum pisi* [Harris]) was evaluated on broad bean plants whose leaves were dipped before infestation; the activities against the milkweed bug (*Oncopeltus fasciatus* [Dallas]) and the plum curculio (*Conotrachelus nenuphar* [Herbst]) were evaluated by spraying the test solution into glass dishes containing the insects; and the activity against the flour bettle (*Tribolium confusam*) was evaluated by spraying the test solution into glass dishes, allowing the sprayed dishes to dry, and then introducing the insects into the dried dishes. After forthy-eight hours of exposure of the test insects are described above, the percent kill was determined. Results presented below and in succeeding examples are each an average of two or more replicates.

Nematode control was measured as follows: A nematode-infested soil was prepared by mixing about 1000 larvae of the root-knot nematode (*Meloidogyne incognita* var. *acrita*) into one liter of sandy-loam soil. Into this infested soil was blended sufficient test compound, formulated as a 5% dust on attapulgite clay, to give a concentration of 25 p.p.m. This mixture was held in the greenhouse in a moist condition for 4–7 days, then young tomato plants were planted in the soil and allowed to grow for 4–6 weeks. When appropriate growth was attained, the roots of the tomato plants were washed free of soil and the degree of infestation was evaluated in comparison with plants grown in nematode-infested soil which had received no chemical treatment. Results, as reported in the table below and in subsequent examples, represent the average of two replicates.

TABLE 1

Presicidal activity of 2,3-dihydro-2,2-dimethyl-7-benzofuranyl N-(chloroacetyl)-N-methylcarbamate

| Test pest: | Percent kill |
| --- | --- |
| Mexican bean beetle | 100 |
| Pea aphid | 100 |
| Southern armyworm | 100 |
| Two-spotted mite | 100 |
| Milkweed bug | 100 |
| Plum curculio | 100 |

Root-knot nematode, complete control, no knots.

Example 2.—Preparation and pesticidal properties of 2,3-dihydro - 2,2 - dimethyl - 7 - benzofuranyl N-hydroxy-N-methylcarbamate This compound was prepared by the reaction of 2,3-dihydro-2,2-dimethyl-7-benzofuranol with phosgene followed by reaction of the resulting chloroformate with N-methylhydroxylamine to form the hydroxycarbamate. The intermedate 2,3-dihydro - 2,2 - dimethyl-7-benzofuranol was prepared by the method of Example 1. A mixture of 82.1 gm. of 2,3-dihydro-2,2-dimethyl-7-benzofuranol and 100 ml. benzene was held in a temperature range of 5–10° while 36 ml. of cold phosgene was added dropwise with stirring. The reaction mass was kept cold and stirred while 60.6 gm. of N,N-dimethylaniline was slowly added. After addition was complete, the mixture was held at 5–10° for four hours and then was allowed to come slowly to room temperature. The reaction mass was treated with 100 ml. of distilled water and 50 ml. of benzene. The resulting oil layer was separated, washed twice with 5% hydrochloric acid (25 ml. for each washing), and dried over calcium chloride. Solvent was removed under reduced pressure leaving 106.3 gm. of solid 2,3-dihydro - 2,2 - dimethyl-7-benzofuranyl chloroformate, which after recrystallization melted at 88–90°.

This chloroformate was converted to the N-hydroxy-N-methylcarbamate as follows: A mixture of 8.4 gm. of N-methylhydroxylamine hydrochloride, 35 ml. of diethyl ether, and 3 ml. of water was chilled while 13.8 gm. of potassium carbonate was added with stirring. The reaction mixture was stirred and held in the temperature range of 15–20° while a slurry of 22.7 gm. of 2,3-dihydro-2,2-dimethyl-7-benzofuranyl chloroformate in 25 ml. of diethyl ether was added dropwise. Following this addition, the reaction mixture was stirred for four hours and was allowed to come to room temperature. After standing overnight the reaction mixture was filtered, and the filtrate was concentrated under reduced pressure to give 25.3 gm. of white solid 2,3-dihydro-2,2-dimethyl-7-benzofuranyl N-hydroxy-N-methylcarbamate. Recrystallized from n-butyl ether, the product melted at 108.0–109.5°.

*Analysis.*—Calc'd for $C_{12}H_{15}NO_4$ (percent): N, 5.91. Found (percent): N, 6.15.

Pesticidal activity was determined by the methods described in Example 1. Results are shown in Table 2 below.

TABLE 2

Pesticidal activity of 2,3-dihydro-2,2-dimethyl-7-benzofuranyl N-hydroxy-N-methylcarbamate

| Test pest: | Percent kill |
| --- | --- |
| Mexican bean beetle | 100 |
| Pea aphid | 100 |
| Southern armyworm | 0 |
| Two-spotted mite | 13 |
| Milkweed bug | 100 |
| Plum curculio | 55 |

Root-knot nematode, complete control, no knots.

Example 3.—Preparation and pesticidal properties of 2,3-dihydro - 2,2 - dimethyl-7-benzofuranyl N-(dimethylamino) carbamate This compound was prepared by the reaction of unsymmetrical dimethylhydrazine with 2,3-dihydro-2,2-dimethyl-7-benzofuranyl chloroformate, which was prepared as described in Example 2. A solution of 14.0 gm. of the chloroformate in 100 ml. of diethyl ether was added dropwise to a stirred solution of 11.2 gm. of unsymmetrical dimethylhydrazine in 50 ml. of diethyl ether held in a temperature range of 0–5° and under a nitrogen atmosphere. Thirty ml. of benzene was added, and the mixture was stirred for one hour without further cooling, then treated with 35 ml. of distilled water and ice. The organic layer was washed twice with distilled water and dried over magnesium sulfate. Removal of solvent under reduced pressure gave 13.3 gm. of solid 2,3-dihydro-2,2-dimethyl-7-benzofuranyl N-(dimethylamino) carbamate. After recrystallization from methylcyclohexane the product melted at 98–99°.

*Analysis.*—Calc'd for $C_{13}H_{18}N_2O_3$ (percent): N, 11.19. Found (percent): N, 11.14.

Pesticidal activity was determined as described in Example 1. Results are shown in Table 3.

TABLE 3

Pesticidal activity of 2,3-dihydro-2,2-dimethyl-7-benzofuranyl N-(dimethylamino) carbamate

| Test pest: | Percent kill |
|---|---|
| Mexican bean beetle | 100 |
| Pea aphid | 100 |
| Southern armyworm | 0 |
| Two-spotted mite | 13 |
| Milkweed bug | 100 |
| Plum curculio | 10 |

Root-knot nematode, 25% control.

Example 4.—Preparation and pesticidal properties of 2,3-dihydro-2,2-dimethyl-7-benzofuranyl N-acetyl-N-methylcarbamate This compound was prepared by the reaction of 2,3-dihydro-2,2-dimethyl-7-benzofuranyl N-methylcarbamate with acetic anhydride. To a mixture of 22.1 gm. of 2,3-dihydro-2,2-dimethyl-7-benzofuranyl N-methylcarbamate, prepared by the method of Example 1, and 120 ml. of acetic anhydride, was added 3 drops of sulfuric acid. The mixture was stirred and heated under reflux for thirty minutes. The mixture was then cooled to room temperature and to it was added 1.5 gm. sodium acetate. The mixture of acetic acid and acetic anhydride was removed by distillation under reduced pressure. The residual oil was dissolved in 50 ml. of benzene. The resulting solution was washed four times with water and then dried over sodium sulfate. The dried solution was distilled under reduced pressure to give 13.1 gm. of 2,3-dihydro-2,2-dimethyl-7-benzofuranyl N-acetyl-N-methylcarbamate which distilled at 104–105° under 0.2 mm; $n_D^{25}$ 1.5224.

Analysis.—Calc'd for $C_{14}H_{17}NO_4$ (percent): C, 63.86; H, 6.51; N, 5.31. Found (percent): C, 64.03; H, 6.43; N, 5.56.

Using the methods described in Example 1, pesticidal activity was shown in Table 4:

TABLE 4

Pesticidal activity of 2,3-dihydro-2,2-dimethyl-7-benzofuranyl N-acetyl-N-methylcarbamate

| Test pest: | Percent kill |
|---|---|
| Mexican bean beetle | 100 |
| Pea aphid | 100 |
| Southern armyworm | 0 |
| Two-spotted mite | 34 |
| Milkweed bug | 100 |
| Plum curculio | 100 |
| Flour beetle | 83 |

Example 5.—Preparation and pesticidal properties of 2,3-dihydro-2-methyl-7-benzofuranyl N-acetal-N-methylcarbamate 3-allylcatechol was prepared by the method of Perkin and Trikojus, J. Chem. Soc. 1927, 1664. A mixture of 35 gm. of 3-allylcatechol, 35 gm. of dimethylaniline hydrochloride, and 0.1 gm. of hydroquinone was heated for 6.75 hours at 175°–185°, cooled, and diluted with 75 ml. of ether. The slurry was washed four times with 35 ml. of water. The organic phase was dried over magnesium sulfate and distilled to yield 13.6 gm. of 2,3-dihydro-2-methyl-7-benzofuranol, which distilled at 76°–77°/0.7 mm.; $n_D^{25}$ 1.5535.

This benzofuranol was converted to the corresponding carbamate as follows: 2,3-dihydro-2-methyl-7-benzofuranol (13.6 gm.) was reacted with 5.7 gm. of methyl isocyanate and the solid product was recrystallized from methylcyclohexane to yield 8.5 gm. of 2,3-dihydro-2-methyl-7-benzofuranyl N-methylcarbate, M.P. 118.5–120°. A mixture of 14.5 gm. of 2,3-dihydro-2-methyl-7-benzofuranyl N-methylcarbamate, 120 ml. of acetic anhydride, and 3 drops of sulfuric acid was heated under reflux for thirty minutes. The mixture was cooled to room temperature and to it was added 1.5 gm. of sodium acetate. The mixture of acetic acid and acetic anhydride was removed by distillation under reduced pressure. The residual oil was dissolved in 50 ml. benzene, the solution washed four times with water, and dried over sodium sulfate. The dried solution was concentrated under reduced pressure and the residue distilled to give 5.1 gm. of 2,3-dihydro-2-methyl-7-benzofuranyl N-acetyl-N-methylcarbamate, which distilled at 106–110°/2.6 mm.; $n_D^{25}$ 1.5320.

Analysis.—Calc'd for $C_{13}H_{15}NO_4$ (percent): C, 62.64; H, 6.06; N, 5.62. Found (percent): C, 62.65; H, 5.77; N, 5.85.

Pesticidal activity was determined using the methods described in Example 1; results are shown in Table 5.

TABLE 5

Pesticidal activity of 2,3-dihydro-2-methyl-7-benzofuranyl N-acetyl-N-methylcarbamate

| Test pest: | Percent kill |
|---|---|
| Mexican bean beetle | 100 |
| Pea aphid | 100 |
| Southern armyworm | 67 |
| Two-spotted mite | 19 |
| Milkweed bug | 100 |
| Plum curculio | 93 |
| Flour beetle | 100 |

Example 6.—Preparation and pesticidal properties of 2-dihydro-2,2-dimethyl-7-benzofuranyl N-acetyl-N-ethylcarbamate Following the procedure described in Example 1, 2,3-dihydro-2,2-dimethyl-7-benzofuranol was reacted with a ten percent molar excess of ethyl isocyanate to give 2,3-dihydro-2,2-dimethyl-7-benzofuranyl N-ethylcarbamate, M.P. 103–104.5°. A mixture of 23.5 gm. of this carbamate, 120 ml. of acetic anhydride, and 3 drops of sulfuric acid was heated under reux for thirty minutes. The mixture was cooled in a water bath, and to it was added 1.5 gm. of sodium acetate. The mixture of acetic anhydride and acetic acid was removed by distillation under reduced pressure, and to the residue was added 50 ml. of benzene. The benzene solution was washed with 50 ml. of water, then three times with 50 ml. of saturated aqueous sodium chloride solution. The benzene solution was dried over sodium sulfate and the dried solution distilled under reduced pressure to give 10 gm. of 2,3-dihydro-2,2-dimethyl-7-benzofuranyl N-acetyl-N-ethylcarbamate, B.P. 105.5–106°/0.01 mm.; $n_D^{25}$ 1.5131.

Analysis.—Calc'd for $C_{15}H_{18}NO_4$ (percent): C, 64.96; H, 6.90; N, 5.05. Found (percent): C, 64.88; H, 6.87; N, 5.15.

The presticidal properties of this compound were determined according to the method described in Example 1. Results are shown in Table 6.

TABLE 6

Pesticidal activity of 2,3-dihydro-2,2-dimethyl-7-benzofuranyl N-acetyl-N-ethylcarbamate

| Test pest: | Percent kill |
|---|---|
| Mexican bean beetle | 100 |
| Pea aphid | 79 |
| Southern armyworm | 0 |
| Two-spotted mite | 15 |
| Milkweed bug | 100 |
| Plum curculio | 19 |
| Flour beetle | 0 |

Example 7.—Preparation and pesticidal properties of 2,3-dihydro - 2,2 - dimethyl-7-benzofuranyl N-amino-N-methylcarbamate This compound was prepared by the reaction of methylhydrazine with 2,3 - dihydro-2,2-dimethyl-7-benzofuranyl chloroformate, prepared as in Example 2. A solution of 22.7 gm. of the chloroformate in 150 ml. of ether was added dropwise to a stirred solution of 4.6 gm. of methylhydrazine and 10.1 gm. of triethylamine in 150 ml. of ether, while the reaction mixture was held in a temperature range of 0–5° and under a nitrogen atmosphere. After the addition the reaction mixture was allowed to come to room temperature. Stirring continued overnight. To the reaction mixture was added 100 ml. of ice water and 50 ml. of benzene. The organic layer was washed twice with distilled water and dried over magnesium sulfate. Solvent was removed under reduced pressure and the remaining oil distilled to give 9.2 gm. of 2,3-dihydro-2,2-dimethyl-7-benzofuranyl N-amino-N-methylcarbamate, B.P. 129°/ 0.20–0.25 mm.; $n_D^{25}$ 1.5434. The position of the N-methyl substituent was established by nuclear magnetic resonance and infrared analysis.

*Analysis.*—Calc'd for $C_{12}H_{16}N_2O_3$ (percent): N, 11.86. Found (percent): N, 11.72.

The pesticidal properties of this compound were determined according to the method described in Example 1. Results are shown in Table 7.

TABLE 7

Pesticidal activity of 2,3-dihydro-2,2-dimethyl-7-benzofuranyl N-amino-N-methylcarbamate

| Test pest: | Percent kill |
| --- | --- |
| Mexican bean beetle | 100 |
| Pea aphid | 100 |
| Southern armyworm | 0 |
| Two-spotted mite | 90 |
| Milkweed bug | 95 |
| Flour beetle | 75 |

Additional pesticidal compounds of the class of this invention may be prepared following procedures exemplified above. Included among such pesticidally active compounds are the following:

Example 8.—2,3-dihydro-2,2,3,3-tetramethyl-7-benzofuranyl N-hydroxy-N-methylcarbamate Example 9.—2,3-dihydro-2,2-dimethyl-7-benzofuranyl N-methoxycarbamate Example 10.—2,3-dihydro-2,2-dimethyl-7-benzofuranyl N-(diisopropylamino)-N-methylcarbamate Example 11.—2,3-dihydro-2,3-dimethyl-7-benzofuranyl N-chloroacetylcarbamate Example 12.—2,3-dihydro-2,2-dimethyl-7-benzofuranyl N-(dimethylaminocarbonyl)carbamate Example 13.—2,3-dihydro-2,2-dimethyl-7-benzofuranyl N-(ethoxycarbonyl)-N-methylcarbamate Example 14.—2,3-dihydro-2,2,3-trimethyl-7-benzofuranyl N-methoxy-N-methylcarbamate Example 15.—2,3-dihydro-2,3-dimethyl-7-benzofuranyl N-bromoacetyl-N-methylcarbamate Example 16.—2,3-dihydro-2,2-dimethyl-7-benzofuranyl N-acrylyl-N-methylcarbamate Example 17.—2,3-dihydro-2,2-dimethyl-7-benzofuranyl N-methacrylyl-N-methylcarbamate Example 18.—2,3 - dihydro-2,2-dimethyl-7-benzofuranyl N-methyl-N-(propoxycarbonyl)carbamate Example 19.—2,3-dihydro-2,2-dimethyl-7-benzofuranyl N-acetyl-N-allyl carbamate Example 20.—2,3-dihydro-2,2-dimethyl-7-benzofuranyl N-(chloroacetyl)-N-propynyl carbamate Example 21.—2,3-dihydro-2,2-dimethyl-7-benzofuranyl N-hexyl-N-methoxycarbonylcarbamate Example 22.—2,3-dihydro-2-methyl-7-benzofuranyl N-benzoyl-N-ethyl carbamate Example 23.—2,3-dihydro-2,2-dimethyl-7-benzofuranyl N-methyl-N-(phenylacetyl)carbamate Example 24.—2,3-dihydro-2,3-dimethyl-7-benzofuranyl N-(dichloroacetyl)-N-methylcarbamate The above examples illustrate the wide variety of compounds useful herein, and characterized by useful pesticidal properties. It is apparent that many modifications may be made in the structure, preparation, formulation, and application of the compounds of this invention.

I claim:
1. The compound 2,3 - dihydro-2,2-dimethyl-7-benzofuranyl N-(dimethylamino)carbamate.

References Cited

UNITED STATES PATENTS

| 3,158,624 | 11/1964 | Leon et al. | 260—347.3 |
| 3,253,982 | 5/1966 | Leon et al. | 424—285 |

FOREIGN PATENTS

| 649,266 | 12/1964 | Belgium. |
| 982,235 | 2/1965 | Great Britain. |

ALEX MAZEL, Primary Examiner

B. I. DENTZ, Assistant Examiner

U.S. Cl. X.R.
424—285